(12) United States Patent
Vets

(10) Patent No.: US 9,488,526 B2
(45) Date of Patent: Nov. 8, 2016

(54) ASSEMBLY FOR SELECTING MATCHING COLOURS TO BASE COLOURS, METHOD, AND USER ARTICLE

(71) Applicant: BRAND NEW IDEAS SARL, Luxembourg (LU)

(72) Inventor: Carita Vets, Broechem (BE)

(73) Assignee: BRAND NEW IDEAS SARL, Luxembourg (LU)

( * ) Notice: Subject to any disclaimer, the term of this patent is extended or adjusted under 35 U.S.C. 154(b) by 240 days.

(21) Appl. No.: 14/386,044

(22) PCT Filed: Mar. 20, 2013

(86) PCT No.: PCT/EP2013/055863
§ 371 (c)(1),
(2) Date: Sep. 18, 2014

(87) PCT Pub. No.: WO2013/139876
PCT Pub. Date: Sep. 26, 2013

(65) Prior Publication Data
US 2015/0042995 A1 Feb. 12, 2015

(30) Foreign Application Priority Data
Mar. 23, 2012 (EP) ..................... 12161131

(51) Int. Cl.
*G01J 3/46* (2006.01)
*B44D 3/00* (2006.01)
*G01J 3/52* (2006.01)

(52) U.S. Cl.
CPC .............. *G01J 3/463* (2013.01); *B44D 3/003* (2013.01); *G01J 3/52* (2013.01); *G01J 3/526* (2013.01)

(58) Field of Classification Search
CPC ............. G01J 3/463; G01J 3/52; G01J 3/46; G01J 3/50; G01J 3/02; G01J 3/524
USPC ................................................ 356/402–425
See application file for complete search history.

(56) References Cited

U.S. PATENT DOCUMENTS

| | | | |
|---|---|---|---|
| 7,197,345 B2 | 3/2007 | Kim et al. | |
| 2004/0131347 A1* | 7/2004 | Lowery | B05D 5/005 396/199 |
| 2009/0004126 A1* | 1/2009 | Lowndes | A61K 8/02 424/63 |

FOREIGN PATENT DOCUMENTS

| | | |
|---|---|---|
| DE | 3033797 A1 | 9/1982 |
| GB | 1153441 A | 5/1969 |
| JP | 60105928 A | 6/1985 |
| WO | WO02054372 A2 | 7/2002 |

OTHER PUBLICATIONS

ISA/EP International Search Report issued Jun. 3, 2013 re PCT Application No. PCT/EP2013/055863, filed Mar. 20, 2013.

* cited by examiner

*Primary Examiner* — Abdullahi Nur
(74) *Attorney, Agent, or Firm* — Patrick J. Daugherty; Driggs, Hogg, Daugherty & Del Zoppo Co., LPA

(57) ABSTRACT

Assembly for selecting matching colors to base colors of user articles. The assembly comprises a substrate provided with a plurality of selection areas that have mutually differing selection colors. The assembly further comprises a cover having a first main surface provided with a first base color and having a second main surface. The cover is provided with a window. The assembly is provided with holding means for holding the cover to the substrate in a first cover position wherein, by means of the window, at least one selection area is exposed. The second main surface is provided with a second base color. The window and the holding means are arranged for holding the cover to the substrate in a second cover position wherein, by means of the window, at least one selection area is exposed.

18 Claims, 8 Drawing Sheets

US 9,488,526 B2

ASSEMBLY FOR SELECTING MATCHING COLOURS TO BASE COLOURS, METHOD, AND USER ARTICLE

RELATED APPLICATION

This application is a national filing of PCT application Serial No. PCT/EP2013/055863, filed Mar. 20, 2013.

TECHNICAL FIELD

The present invention relates to an assembly for selecting matching colours to base colours of user articles, e.g. clothing articles and/or furniture articles, the assembly comprising a substrate provided with a plurality of selection areas that have mutually differing selection colours among which are the matching colours, wherein the assembly further comprises a cover having a first main surface provided with a first base colour, and having, opposite to the first main surface, a second main surface, the cover further being provided with a window, wherein the assembly is provided with holding means for holding the cover to the substrate, wherein the window and the holding means are arranged for holding the cover to the substrate in a first cover position wherein, by means of the window, at least one selection area is exposed having a matching colour that matches, based on a predetermined matching method, the first base colour. The invention further relates to a user article, e.g. a clothing article and/or a furniture article. The invention further relates to a mobile phone. The invention also relates to a method of selecting matching colours to base colours of user articles, e.g. clothing articles and/or furniture articles.

BACKGROUND ART

A prospective buyer of a user article such as a clothing article in a store usually makes various choices. Apart from e.g. type and size of the clothing article, a choice is made related to a colour of the clothing article. The clothing article can e.g. be available in different colour schemes or in only one colour scheme. A colour scheme can contain only one colour, or may contain a plurality of different colours. In both cases, a main factor that determines the choice for a certain colour is whether that colour matches another colour, e.g. a colour of another clothing article. Experience has shown that relatively few people are able to combine various colours really well. However, matching methods for assisting a user choosing a colour of a clothing article have not been available to the user in a convenient way.

Patent specification GB 1,153,441 shows a device having a mask and having a display provided with colour samples. The device of GB 1,153,441 can be used for displaying available colours of a certain type of paint. A mask is provided for the certain type of paint. If a prospective buyer wants to match two different types of paint, the buyer can superimpose the covers available for both types of paint and see what colours are available for both types of paint. Thus, it can be determined whether a colour wherein one type of paint is available matches a colour wherein another type of paint is available.

However, when matching two different types of paint by using the device of GB 1,153,441, the user can only be assisted in selecting two colours that match because they are the same. Thus, the matching method enabled by the device of GB 1,153,441 can only be based on selection of the same colours. Applying such a matching method to clothing articles—or to other articles—would lead a buyer only to combinations of articles that have the same colour. Thus, the device of GB 1,153,441 only enables one specific method of selecting a matching colour. Furthermore, when selecting matching colours, two superimposed masks are necessary when using the device of GB 1,153,441.

DISCLOSURE OF THE INVENTION

It is an aim of the present invention to provide an improved assembly and method that enables a user to select matching colours to base colours based on a predetermined matching method.

According to an aspect of the invention, there is provided an assembly for selecting matching colours to base colours, preferably of user articles, e.g. clothing articles and/or furniture articles, the assembly comprising a substrate provided with a plurality of selection areas that have mutually differing selection colours among which are the matching colours, wherein the assembly further comprises a cover having a first main surface provided with a first base colour, and having, opposite to the first main surface, a second main surface, the cover further being provided with a window, wherein the assembly is provided with holding means for holding the cover to the substrate, wherein the window and the holding means are arranged for holding the cover to the substrate in a first cover position wherein, by means of the window, at least one selection area is, preferably selectively, exposed having a matching colour that matches, based on a predetermined matching method, the first base colour, wherein the second main surface is provided with a second base colour, and the window and the holding means are arranged for holding the cover to the substrate in a second cover position wherein, by means of the window, at least one selection area is, preferably selectively, exposed having a matching colour that matches, based on a predetermined matching method, the second base colour, wherein, when the cover is in the first cover position, the first main surface faces away from the substrate so that it is visible to a user of the assembly, and, when the cover is in the second cover position, the second main surface faces away from the substrate so that it is visible to a user of the assembly.

An assembly comprising a cover may thus be provided that can be used in two different cover positions. In the first cover position, one or more matching colours to the first base colour may be selected. In the second cover position, one or more matching colours to the second base colour may be selected. The assembly may thus provide to a user a relatively convenient way to select colours that match the first base colour and/or the second base colour, needing only a single cover. It may thus be appreciated that both main sides of the cover can be used for selecting a matching colour to a base colour. It may be appreciated that said exposing of at least one selection area, with the cover in the first or second cover position, preferably is selective. Hence, with the cover in the first or second cover position, the cover may also cover a number of selection areas.

The assembly may comprise, in an embodiment, a plurality of covers, e.g. two or three covers. Covers of said plurality of covers preferably have mutually differently formed windows. Preferably, each cover is provided with two base colours that are different from base colours of other covers of the plurality of covers. Preferably, three pairs of a first base colour and a second base colour of three respective covers form together six mutually different base colours. Thus, in an embodiment, relatively few covers may be needed to select matching colours to base colours that may be mutually different. The cover is preferably formed as a card having the first main surface and the second main surface. The first main surface and the second main surface may be provided respectively on opposing surfaces of the card. Preferably, the substrate and the cover are designed to be moveable with respect to each other.

The assembly of the invention may be used in for example the following applications:
- in fashion, to advise users which colours he or she can wear to match a main piece of clothing in a base colour, i.e. to assist the user to select other clothing articles or accessories in matching colours e.g. according to the latest trends;
- in interior decoration, to advise users who have selected one colour as base colour for e.g. walls of a room, which colours can be used for the other walls, furniture, decorative pieces etc, to obtain a matching colour palette; and/or
- to enhance safety, e.g. to advise users which colour combinations make a person or an object stand out in a given environment, so that it can be avoided that the person or object is hit or struck by accident.

The base colour may e.g. be a trend colour, e.g. a colour according to a recent trend. However, the base colour may alternatively be another colour, e.g. a colour preferred by a user for another reason than a recent trend.

Preferably, the cover defines or has a center, e.g. a central axis or a central point, of the cover, wherein at least a portion of the window is positioned asymmetrically with respect to the center, so that, in the first cover position, at least one selection area, preferably at least two, at least three, at least four, or at least five selection areas, is exposed that is not exposed in the second cover position. Preferably, the center is positioned similarly with respect to the substrate in both the first cover position and the second cover position. As a result of the at least one selection area preferably being only visible in one of the first and second cover position, at least one of the matching colours preferably is different in the second cover position compared to the first cover position. Thus, a distinction in at least one of the matching colour may be realised when comparing matching colours of the first base colour with matching colours of the second base colour. Hence, with the cover in the first cover position, a set of matching colours may be exposed that is different from a set of matching colours that is exposed with the cover in the second cover position.

It may be appreciated that, when a number of the selection areas that are visible only for one specific cover position is increased, a contrast between selected colours for one base colour compared to another base colour may be enhanced. Therefore, preferably, the cover defines a center, e.g. a central axis or a central point, of the cover, wherein the window is positioned asymmetrically with respect to the center, so that each selection area that is exposed in the second cover position is covered, e.g. is not visible, in the first cover position. Preferably, the center is positioned similarly with respect to the substrate in both the first cover position and the second cover position.

It may, alternatively or additionally, be appreciated that one or more selection colour are visible in both the first cover position and the second cover position. Therefore, preferably, the cover defines a center, e.g. a central axis or a central point, of the cover, wherein a portion of the window is positioned substantially symmetrically with respect to the center, so that, in the first cover position, at least one selection area is exposed that is also exposed in the second cover position. Preferably, the center is positioned similarly with respect to the substrate in both the first cover position and the second cover position.

The selection areas may optionally be arranged along arrays, e.g. rows and/or columns. The arrays may extend in parallel with the central axis. In case there is an odd number of arrays, a single central array can be defined when the cover is held by the substrate. The central array may at least partly coincide with the central axis when the cover is held by the substrate. Then, a window portion that at least partly coincides with the central axis may expose a selection area of the central array that is exposed irrespective whether the cover is in the first cover position or in the second cover position. Alternatively, there may optionally be provided an even number of arrays, that are preferably aligned with the central axis.

Preferably, the window may be provided with a plurality of window portions, e.g. sub-windows, that are mutually spaced apart. In an embodiment, the window may be provided with six window portions, e.g. sub-windows, that are mutually spaced apart. Such designs are considered practically valuable by enabling a convenient amount of matching colours to a user.

In an embodiment, the substrate is provided with the holding means. Preferably, the holding means comprise a guide for guiding the cover towards, e.g. in a direction along the central axis, the first cover position with the first main surface facing away from the substrate, and for guiding the cover towards, e.g. in a direction along the central axis, the second cover position with the second main surface facing away from the substrate. In particular, the substrate comprises an edge portion that is provided with at least one groove that forms the guide.

Preferably, the substrate is provided with a protective coating that covers the selection colours and/or the selection areas. Such a coating may help the substrate to be resistant against frequent contact with the cover and/or other objects. As the substrate may be used with various covers, durability of especially the substrate may be appreciated.

In an embodiment, outer dimensions of the substrate in a direction parallel with an array of the selection areas of the substrate may be substantially similar to corresponding outer dimensions of a mobile phone. The substrate may optionally be substantially rectangular, optionally with rounded corners. A width of the substrate may e.g. be at most ten centimeter, e.g. approximately eight centimeter. A length of the substrate, measured in a direction transverse to a measuring direction of said width, may e.g. be at most fourteen centimeter, e.g. in between eleven and twelve centimeter. As a result, the substrate can be carried by a user relatively easily. In another embodiment, the substrate and cover(s) may be of credit card size.

In an embodiment, the assembly may comprise orientation means for defining the correct orientation of the cover with respect to the substrate in the first and second cover positions. For example the holding means comprise a snap-fit connection for holding the cover to the substrate and thereby defining the first cover position and the second cover position. Thus, it may be promoted that the correct selection colours are exposed. Optionally, the snap-fit connection is formed by a cavity, e.g. recess or a hole, in the cover that is designed to cooperate with a corresponding projection comprised by the substrate. Alternatively or additionally, the snap-fit connection may be formed by a cavity, e.g. a recess or a hole, in the substrate that is designed to cooperate with a corresponding projection comprised by the cover. A cover formed as a flexible plastic card may be preferred for obtaining the snap-fit connection. Alternatively, or additionally, an indicator may be provided on the cover to indicate for example a top side thereof, as orientation means.

In an embodiment, the substrate may be combined with a storage compartment for storing the one or more covers provided with the base colours. The substrate may for example be provided on a front side of a box-like element forming the storage compartment for the cover(s). In this way, it can be enabled that the user has various, e.g. all, possible covers with base colours at hand. Also, it can be avoided that covers are easily lost.

According to an aspect of the invention, there is provided a user article, e.g. a clothing article and/or a furniture article, in assembly with the cover, and/or in assembly with the substrate, of an assembly according to the invention.

According to an aspect of the invention, there is provided a mobile phone provided with the cover and/or the substrate of an assembly according to the invention.

According to an aspect of the invention, there is provided a method of selecting matching colours to base colours, preferably of user articles, e.g. clothing articles and/or furniture articles, the method comprising: —providing a substrate provided with a plurality of selection areas that have mutually differing selection colours among which are the matching colours; —providing a cover having a first main surface provided with a first base colour, preferably of a first user article, and having, opposite to the first main surface, a second main surface, the cover further being provided with a window; —holding the cover to the substrate in a first cover position wherein, by means of the window, at least one selection area is, preferably selectively, exposed having a matching colour that matches, based on a predetermined matching method, the first base colour, wherein, when the cover is in the first cover position, the first main surface faces away from the substrate so that it is visible to a user of the assembly; —holding the cover to the substrate in a second cover position wherein, by means of the window, at least one selection area is, preferably selectively, exposed having a matching colour that matches, based on a predetermined matching method, a second base colour, preferably of a second user article, wherein the second main surface is provided with the second base colour, wherein, when the cover is in the second cover position, the second main surface faces away from the substrate so that it is visible to a user of the assembly.

It may be appreciated that said exposing of at least one selection area, with the cover in the first or second cover position, preferably is selective. Hence, with the cover in the first or second cover position, the cover may also cover a number of selection areas.

In an embodiment, the method further comprises: —combining the first user article with a further user article, e.g. a further clothing article and/or a further furniture article, having a selected matching colour that matches, based on the predetermined matching method, the first base colour; and/or —combining the second user article with a further user article, e.g. a further clothing article and/or a further furniture article, having a selected matching colour that matches, based on the predetermined matching method, the second base colour.

Preferably, the method is carried out by means of an assembly according to the invention.

Features of embodiment disclosed above for an aspect may be combined with embodiments or features disclosed for one or more other aspects.

BRIEF DESCRIPTION OF THE DRAWINGS

The invention will be further elucidated by means of the following description and the appended figures.

DEFINITIONS

Figure 1A:
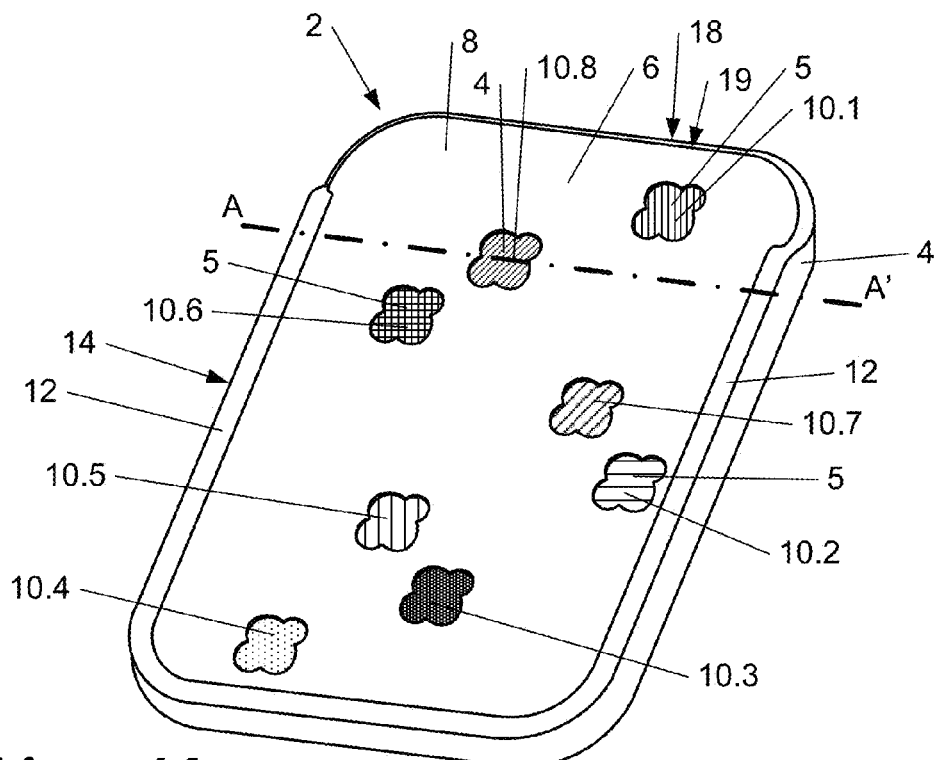
FIG. 1A shows, in an embodiment according to the invention, a perspective view of an assembly for selecting matching colours to base colours of clothing articles.

As used herein, with "window" may be meant one or a combination of more than one apertures, gaps, glazed holes or the like in a non-transparent cover.

As used herein, with "sub-window" may be meant one of the apertures, gaps, glazed holes or the like of the window.

As used herein, with "window portion" may be meant one or a combination of more than one, but not all of, the sub-windows, apertures, gaps, glazed holes or the like of the window.

MODES FOR CARRYING OUT THE INVENTION

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Embodiments are described herein with reference to a clothing article. However, such embodiments can optionally be applied more generally for other user articles as well, e.g. for furniture articles. The term "clothing article" may e.g. refer to a shoe, a blouse, a pair of trousers, a necklace, an earring, a hat, a skirt, or the like, or combinations thereof. The term "furniture article" may e.g. refer to a sofa, a carpet, a chair, a lamp, a curtain, or the like, or combinations thereof. The selection of matching colours to base colours of clothing articles and/or furniture articles by means of embodiments of the invention may especially be appreciated. Such selections have to be made by a user relatively often, e.g. weekly or even daily, during a certain period of time. Then, a relatively easy choice of clothing and/or furniture articles may in particular be appreciated. Furthermore, selecting the right colours for clothing articles and/or furniture articles is usually important for achieving user satisfaction.

Figure 1B:
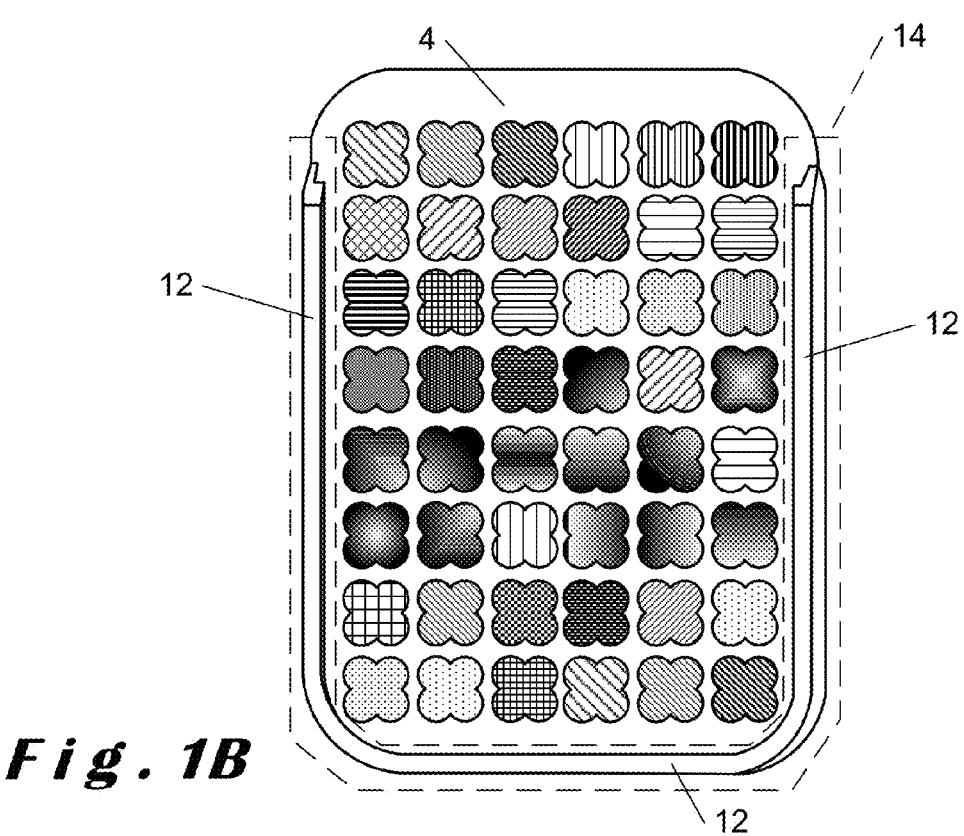
FIG. 1B shows a substrate of the assembly of FIG. 1A without a cover.
Figure 1C:
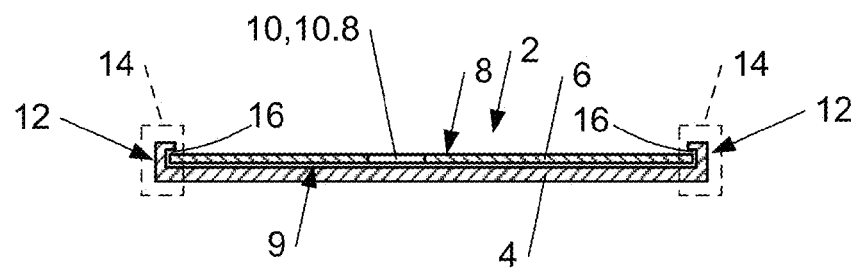
FIG. 1C shows a cross-sectional view of an assembly along a cross-section indicated in FIG. 1A.

FIG. 1A shows, in an embodiment according to the invention, a perspective view of an assembly 2 for selecting matching colours to base colours of clothing articles. The assembly 2 comprises a substrate 4 provided with a plurality of selection areas 5 that have mutually differing selection colours. Among the selection colours are the matching colours. The assembly 2 further comprises one or more covers 6. FIG. 1B shows the substrate 4 of the assembly of FIG. 1A without the cover 6. FIG. 1C shows a cross-sectional view of the assembly along a cross-section A-A' indicated in FIG. 1A.

The cover 6 has a first main surface 8 provided with a first base colour. The cover 6 has, opposite to the first main surface 8, a second main surface 9. The cover 6 may be formed as a card, having the first main surface 8 and the second main surface 9 forming both sides of the card. In the illustration of FIG. 1A, the second main surface is facing the substrate. The cover 6 is further being provided with a window 10. In the embodiment illustrated with respect to FIGS. 1A and 1B, the window 10 comprises a plurality of window portions, here sub-windows, that are mutually spaced apart, in this example eight window portions 10.$i$ ($i=1, \ldots , 8$). Alternatively, in an embodiment, the window 10 may comprise one, two, three, four, five, six, seven, nine, ten, or more than ten, i.e. at least ten, window portions, which window portions are preferably mutually spaced apart, i.e. are preferably mutually separated. Outside the window 10, part of, or the whole of, the first main surface may have the first base colour.

The assembly 2 is provided with holding means for holding the cover 6 to the substrate 4. In the embodiment illustrated with respect to FIGS. 1A and 1B, the substrate 4 is provided with the holding means 12. FIG. 1A shows the cover 6 in a first cover position, wherein the first main surface 8 faces away from the substrate 4. Hence, in the first cover position, the first main surface is visible to a user of the assembly. By releasing the cover 6 out of the holding means 12, turning the cover or the holding means, and putting the cover back into the holding means so that, instead of the second main surface, the first main surface is facing the substrate, the cover can be put in a second cover position wherein the second main surface 9 faces away from the substrate.

The second main surface 9 is provided with a second base colour. Outside the window 10, part of, or the whole of, the second main surface may have the second base colour. The window 10 and the holding means 12 are arranged for holding the cover 6 to the substrate in the second cover position so that, by means of the window 10, at least one selection area is exposed having a matching colour that matches, based on a predetermined matching method, the second base colour. In the second cover position, the second main surface faces away from the substrate so that it is visible to a user of the assembly. It may be clear from FIG. 1A that selection areas may be selectively exposed, so that not all selection areas are exposed. A number of selection areas may thus be covered.

The holding means 12 may e.g. comprise a guide for guiding the cover towards the first cover position with the first main surface 8 facing away from the substrate 4, and for guiding the cover towards the second cover position with the second main surface 9 facing away from the substrate 4. The substrate may e.g. comprise an edge portion 14 that is provided with a groove 16 that forms the guide. Such is illustrated e.g. in FIG. 1C. Thus, more in general, the substrate may be provided with the holding means. Thus, the substrate may be formed as a holder for holding a cover, in the first cover position or in the second cover position.

The substrate may e.g. have a substantially rectangular shape, as illustrated in the example of FIGS. 1A-1C. The holding means 12, in particular the groove 16, may extend along at least two, in particular three, sides of the substrate 4. Thus, the cover may be reliably held in the groove 16. Alternatively to a rectangular shape, the substrate may e.g. have a triangular shape. More in general, the substrate may have a polygonal shape. The substrate may e.g. have a substantially square shape. One or more, e.g. all, of the corners of the polygonally shaped substrate are preferably rounded. Preferably, at least one side 18 of the polygonally-shaped substrate lacks the holding means, in particular lacks the groove 16. Then, the cover 6 may be slid into the groove 16 via that at least one side 18. In the first and second cover position, one and the same edge portion 19 of the cover 6 may be positioned along the at least one side 18 that lacks the groove 16.

The holding means 12 are arranged for holding the cover 6 to the substrate 4 in a first cover position. FIG. 1A shows an example of the first cover position. In the first cover position, by means of the window 10, eight selection areas 5 are exposed having a matching colour. Please note that in another embodiment, less than eight or more than eight selection areas 5 may be exposed. More in general, the number of exposed selection areas 5 is preferably the same as the number of sub-windows in the cover 6.

The matching colours of the selection areas 5 match, based on a predetermined matching method, the first base colour. Various predetermined matching methods may be used. By way of example, a first predetermined matching method is illustrated with reference to FIGS. 2A and 2B.

Figure 2A:
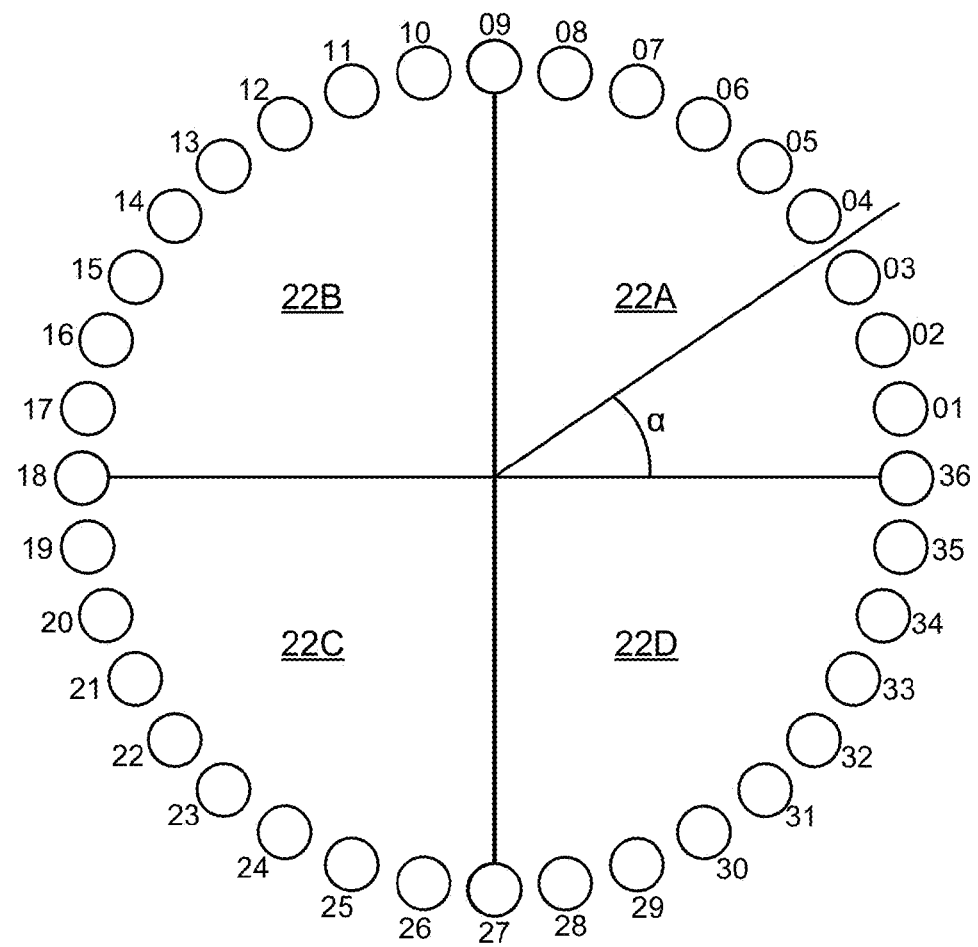
FIG. 2A shows a colour circle having four quadrants.

FIG. 2A shows a colour circle having four quadrants, i.e. a first quadrant 22A, a second quadrant 22B, a third quadrant 22C, and a fourth quadrant 22D. In the colour circle, a colour number (01, ..., 36) may be assigned to each colour C. The first quadrant 22A may contain colours C.i (1=01, ..., 09) in a range from red to yellow. Colour C.01 may correspond to red. Colour C.09 may correspond to yellow. The second quadrant 22B may contain colours C.i (i=10, ..., 18) in a range from yellow to green. Colour C.18 may correspond to green. The third quadrant 22C may contain colours C.i (i=19, ..., 27) in a range from green to blue. Colour C.27 may correspond to blue. The fourth quadrant 22D may contain colours C.i (i=28, ..., 36) in a range from blue to magenta. Colour C.36 may correspond to magenta. Colours in the first and second quadrant may be regarded as relatively warm colours. Colours in the third and fourth quadrant may be regarded as relatively cold colours. A base colour, e.g. the first base colour and/or the second base colour, may be chosen from the colours C.i (i=1, ..., 36).

Colours may be expressed in various ways. For example, a colour may be defined by means of a colour angle cc along the colour circle. A colour having number 05 may have a colour angle of 50 degrees. Additionally, the colour may be defined by means of a colour intensity and/or by means of a luminance level. Said colour intensity may e.g. be expressed on a scale from 1 to 100. It is additionally noted that various standardised colour characterisation schemes are known, e.g. schemes known to the skilled person as HCL, CMYK, Pantone, and RGB. It may thus be clear that representation of colours having fixed numbers 1, ..., 36 along the colour circle may be considered as an example to illustrate various predetermined matching methods of colours. If reference to a certain colour along the colour circle is made to illustrate a matching method, said illustrated matching method may also be carried out for a base colour that is equal to a colour on the colour circle adjacent to that certain colour, e.g. having a colour angle that is within a range of +/− five degrees with respect to a colour angle cc of said certain colour.

Figure 2B:
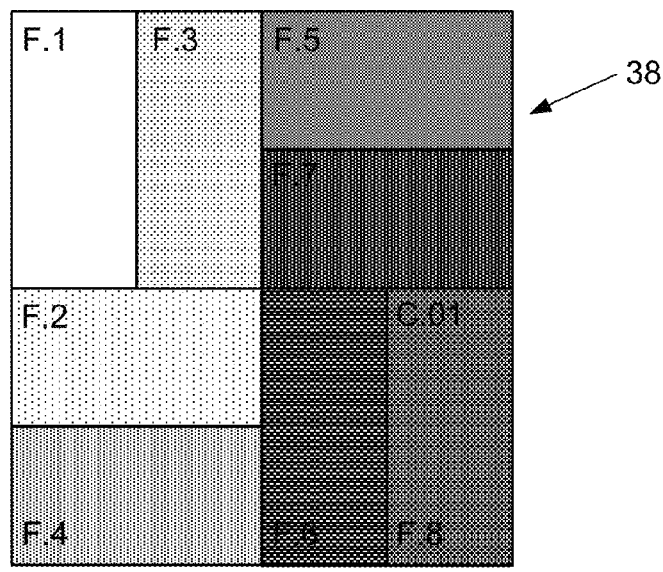
FIG. 2B shows a schematic representation of a square filled with family colours.

Matching colours may be combined to base colours in various ways. In a first variant of the first predetermined matching method, matching colours may be combined to base colours approximately monochromatically. Such combining may comprise selecting one or more matching colours to a base colour, wherein the matching colours are slightly different from the base colour. Hence, the selecting may comprises selecting one or more nuances of the base colour. Each of the 36 colours C.i (i=01, ..., 36) may comprises a colour family. Such a colour family may comprise various nuancing colours of the colour 36.i. Combinations within a colour family may be regarded as monochromatic combinations. A colour family may e.g. comprise eight nuancing colours. FIG. 2B shows a schematic representation of a rectangle 38 filled with family colours F.j 0= 1, ..., 8). Said family colours F.j form nuancing colours of a base colour, which base colour may e.g. be equal to a colour C.01 of the colour circle shown in FIG. 2A. In order to select matching colours, here nuancing colours, to a base colour, e.g. equal to colour C.01, colours of the colour circle may be selected that are, in the colour circle, successive or preceding to the base colour. Thus, for example, matching colours F.j 0=29, ..., 36) or F.j (j=2, ..., 9) or F.j (j= 33, ... 35, 02, ..., 06) may be selected to match a base colour equal to colour C.01. Alternatively or additionally, family colours F.j may be selected among colours of a colour family that have a colour number that is twice as large or twice as small as a colour number of the base colour in a colour family. Alternatively or additionally, family colours may be selected from colours of a colour family that, when summed with the colour number of the base colour, are equal to eight or a multiple of eight. It may be appreciated that one or more matching colours combined with a base colour according to the first variant of the predetermined matching method, in one or more clothing articles, may enable realising a relatively elegant look.

In a second variant of the first predetermined matching method, matching colours may be combined to base colours approximately analogously. Such analogous combining may comprise selecting a matching colour that is positioned on the colour circle next to the base colour to which the matching colour is matched. For example, a matching colour C.j (j=i+1) or (j=i−1) may be selected to match a base colour C.i. Thus, the matching colour C.j may be regarded as an analogous colour to the base colour C.i. Analogous colours of a base colour, i.e. matching colours obtained by means of an analogous variant of the first predetermined matching method, may be combined with nuancing colours of said base colour and/or with nuancing colours of said analogous colours. It may be appreciated that one or more matching colours combined with a base colour according to the second variant of the predetermined matching method, in one or more clothing articles, may enable realising a relatively classy and/or elegant look.

In a third variant of the first predetermined matching method, matching colours may be combined to base colours approximately achromatically. In this variant, a base colour may be a grey colour and the one or more matching colours may be a grey colour having a different grey value than the base colour. It may be appreciated that one or more matching colours combined with a base colour according to the third variant of the predetermined matching method, in one or more clothing articles, may enable realising a relatively business-like look.

In a fourth variant of the first predetermined matching method, matching colours may be combined to base colours approximately complementary. Thus, one or more matching colours may be selected to a base colour, said one or more matching colours being complementary to said base colour. For a base colour being approximately equal to a colour C having a number i on the colour circle, a complementary colour may be selected by adding or subtracting the number eighteen to said colour number i. Thus, a base colour having colour number i on the colour circle may have a complementary colour having colour number i+18 or i−18 on the colour circle. At least a number of nuancing colours of the complementary colour may also be regarded as a complementary colour to said base colour. A complementary colour to a base colour may also be regarded as being a complementary colour to at least a number of nuancing colours of said base colour. Complementary colours of a base colour may be combined with at least a number of nuancing colours of said base colour and/or with analogous colours of said base colour.

Preferably, if in a clothing article, or in a combination of clothing articles, two complementary colours are combined with a base colour. One of these complementary colours preferably extends over a significantly larger part of an outer surface area of said clothing article, or of said combination of clothing articles, than the second complementary colour. It may be appreciated that one or more matching colours combined with a base colour according to the fourth variant of the predetermined matching method, in one or more clothing articles, may enable realising a relatively trendy look.

In a second predetermined matching method, matching colours may be combined to base colours to form a group of two, three, four, five, six, or more than six colours. In a first variant of the second predetermined matching method, matching colours may be combined to base colours to form a group, or a subgroup, of two or three colours. A first matching colour to a base colour may have a colour number on the colour circle that is twelve higher or twelve lower than a colour number of the base colour. Additionally, a colour number of a second matching colour may be twelve higher respectively twelve lower than the colour number of the first matching colour. Additionally, nuancing colours may be selected that are nuancing to the base colour, the first matching colour and/or the second matching colour. Preferably, no analogous colours are selected that are analogous to the base colour, the first matching colour, and/or the second matching colour. Thus, e.g., a group of three colours may be obtained with colour numbers 08, 20, and 32, or a group of three colours having colour number 11, 23, and 35. One colour number of one group of three colour numbers may be the colour number of the base colour, while the other colour numbers may be colour numbers of the matching colours to said base colour. Additionally to selecting one or more matching colours to form a group of two or three colours, nuancing colours may be selected to one or more of the colours of a group of two or three colours. If further nuancing colours are selected, the group of two or three colours may be regarded as a sub-group.

In a second variant of the second predetermined matching method, matching colours may be combined to base colours to form a group, or a subgroup, of four, five, or six colours. A first matching colour to a base colour may have a colour number on the colour circle that is six higher or six positions than the base colour. Additionally, a colour number of a second matching colour may be six higher respectively six lower than the colour number of the first matching colour. Additionally, a colour number of a third matching colour may be six higher respectively six lower than the colour number of the second matching colour. Additionally, a colour number of a fourth matching colour may be six higher respectively six lower than the colour number of the third matching colour. Additionally, a colour number of a fifth matching colour may be six higher respectively six lower than the colour number of the fourth matching colour. Additionally, nuancing colours may be selected that are nuancing to the base colour, the first matching colour, the second matching colour, the third matching colour, the fourth matching colour and/or the fifth matching colour. Preferably, no analogous colours are selected that are analogous to base colour, the first matching colour, the second matching colour, the third matching colour, the fourth matching colour and/or the fifth matching colour. Thus, a group of four, five, or six colours may be obtained with e.g. at least colour numbers 06, 12, 18, 24, and optionally also colour number 30 and/or colour number 36. If further nuancing colours are selected, the group of four, five or six colours may be regarded as a sub-group.

According to a further predetermined matching method, a matching colour may be selected in order to promote that the combination of a base colour and a matching colour provides an easily noticeable combination. Such may e.g. be useful to enhance security of a user of clothing having said combination of colours, e.g. when the user takes part in traffic, e.g. on a bike or as a pedestrian.

Various types of cover 6 may be provided. The cover may e.g. be flexible or may be rigid. The cover may e.g. be made of a plastic material. The cover may be relatively thin. In an embodiment, a thickness of the cover is less than a thickness of the substrate. A plastic, relatively thin and/or flexible cover may be appreciated in an assembly of the cover and a clothing article, e.g. when the clothing article is provided with the cover. The first main surface of the cover may have a colour, e.g. the first base colour, that is different from a colour, e.g. the second base colour, of the second main surface.

In an embodiment, the window may be formed by an opening in the cover. The window portions may be formed by mutually separate apertures. The opening, in particular the apertures, may e.g. be punched in the cover. The apertures may be formed to express a logo or mark, e.g. a logo or a mark of a provider of the cover. In that way, the user may associate the cover to a brand having the logo or the mark. Thus, creation of a brand association may be supported. Together, the apertures may form the opening.

Alternatively, the window may be formed by a transparent part of the cover. Then, the window portions may be formed by portions of said transparent part. The window may, alternatively, be formed by a transparent part of the cover and by an opening in the cover. In an embodiment, the cover may comprise a transparent plate, e.g. substantially made of glass and/or a transparent plastic. The transparent plate may be flexible or may be rigid. The transparent plate may be provided with a coating wherein one or more gaps are provided that form the window. Thus, positions on the cover where no coating is provided may define the window. Such positions are preferably surrounded by coated parts. Preferably, the cover is provided with a first coating on the first main surface and with a second coating on the second main surface. Both coatings may be similar to each other. However, said coatings may have different colours in case the coatings define respectively the first and second base colour. In particular, a window defined by the first coating may be similar to a window defined by the second coating. In an embodiment, the coating is removable. Thus, an earlier coating having an earlier window may be replaced by a later coating having a later window that is different from the earlier window. The coating may e.g. be applied to the cover by means of a printing method.

Various types of substrate may be used. The substrate may e.g. be substantially made of a plastic material or of cardboard. Outer dimensions of the substrate in a direction parallel with an array of the selection areas of the substrate may e.g. be substantially similar to corresponding outer dimensions of a mobile phone. In an embodiment, there may be provided a mobile phone provided with the cover 6 and/or the substrate 4. The substrate 6 may be conformal with an outer surface of a backside of a mobile phone. Thus, the substrate may be attached to the backside of the mobile phone. The selection areas may face away from the mobile phone. Hence, the selection areas may be visible to a user of the mobile phone.

The selection areas may be substantially rectangular or square. Thus, a relatively large part of the surface can be covered by selection colours. Alternatively or additionally, the selection areas may be formed to express a logo or mark, e.g. a logo or a mark of a provider of the substrate. At some of the edges of the substrate, the substrate may comprise grooves or slots 16 wherein a cover can be slid, e.g. into the first cover position or the second cover position. If the cover is slid in the grooves or slots into the first or second cover position, matching colours may be visible to a user that match the first respectively second base colour. The substrate may be provided with a protective coating that covers the selection colours and the selection areas.

Figure 3:
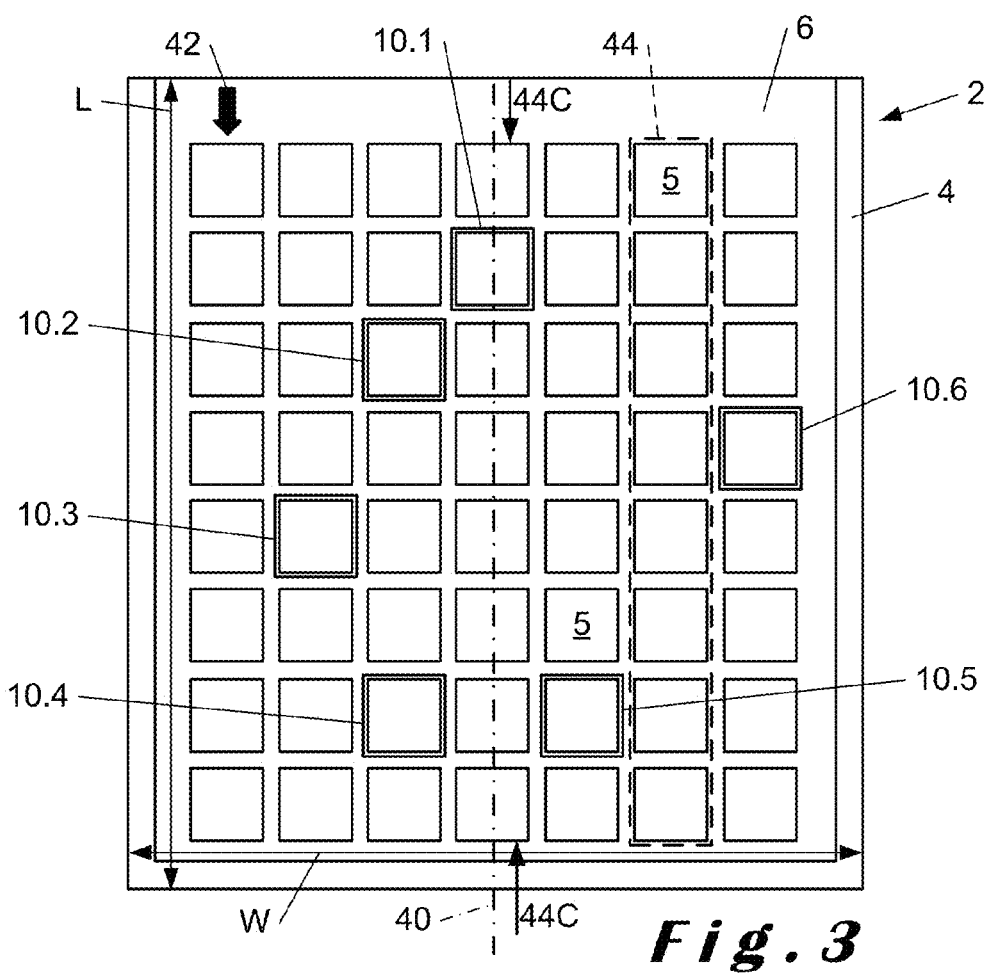
FIG. 3 schematically shows, in an embodiment according to the invention, a view of an assembly for selecting matching colours to base colours of clothing articles, said view being transparent through a cover of the assembly.

FIG. 3 schematically shows, in an embodiment according to the invention, a view of an assembly 2 for selecting matching colours to base colours of clothing articles, said view being transparent through a cover 6 of the assembly. The assembly 2 comprises a substrate 4 provided with a plurality of selection areas 5 that have mutually differing selection colours. Among the selection colours are the matching colours.

The assembly 2 further comprises a cover 6. In an embodiment; the cover 6 may be substantially rectangular. An outer dimension, e.g. a width W, of the substrate 6 in a direction parallel with an array of the selection areas of the substrate may e.g. be substantially similar to a corresponding outer dimension, e.g. a width, of a mobile phone. A length of another dimension, e.g. a length L, of the substrate, measured in a direction transverse to a measuring direction of said width W, may e.g. be substantially similar to a corresponding outer dimension, e.g. a length, of a mobile phone. Hence, the substrate can be carried by a user relatively easily.

The cover is provided with the window 10, preferably comprising a plurality of sub-windows, e.g. apertures, 10.*i* (1, . . . , 6). Such sub-windows may, more in general, be regarded as window portions. Additionally, a combination of sub-windows may be regarded as a window portion.

The cover may define a center of the cover, here a central axis 40 of the cover 6. The central axis 40 may be imaginary. The central axis 40 may be positioned in between edges of the cover that extend along holding means 12 of the substrate 4. Thus, the central axis 40 may be defined. At least a portion of the window may be positioned asymmetrically with respect to the central axis 40.

FIG. 3 shows the cover in the first cover position wherein the first main surface 8 of the cover 6 faces away from the substrate 6 so that it is visible to a user of the assembly. In the second cover position, the second main surface of the cover that is positioned opposite to the first main surface, faces away from the substrate so that it is visible to a user of the assembly.

In the example of FIG. 3, sub-windows 10.2, 10.3, and 10.6 are positioned asymmetrically with respect to the central axis 10.4. Thus, selection areas 5 visible through window portions 10.2, 10.3, and 10.6 with the cover positioned in the first cover position, are not visible with the cover in the second cover position.

In the example of FIG. 3, sub-window 10.1 is positioned symmetrically with respect to the central axis 40. Thus, a selection area that is exposed through the sub-window 10.1 is visible to a user when the cover is in the first or the second cover position. Furthermore, the combination of sub-windows 10.4 and 10.5 may be regarded as a single window portion. This single window portion is positioned substantially symmetrically with respect to the central axis 40, e.g. within three millimeter of a symmetrical position. Thus, the selection areas that are exposed through the single window portion 10.4, 10.5 are visible to a user, irrespective of whether the cover is in the first cover position or in the second cover position.

The selection areas may, as illustrated in FIG. 3, e.g. be arranged in columns 44. The central axis 40 may, in the first or second cover position, e.g. partly coincide with a central column of selection areas 5. The columns 44 may extend in parallel with the central axis. Preferably, there is provided an odd number of columns, so that a central column 44C can be defined. The central column may at least partly coincide with the central axis 44. Then, a window portion 10.1 that at least partly coincides with the central axis 44 may expose a selection area 5 of the central column that is exposed irrespective whether the cover is in the first cover position or in the second cover position.

In the illustration of FIG. 3, the substrate 4 is provided with the holding means 12. The holding means may comprise the guide 16. The guide may be aligned with the central axis 40. Hence, the guide may be arranged for guiding the cover in a direction along the central axis towards, or from, the first cover position or towards, or from, the second cover position. The cover may be provided with an orientation indication 42 for indicating a desired orientation of the cover when held to the substrate. The orientation indication 42 may be provided on the first main surface and/or on the second main surface. Thus, a probability of exposing undesired selection areas through the window may be reduced. Alternatively or additionally, the holding means may comprise a snap-fit connection for holding the cover to the substrate. Such a snap-fit connection may be formed by the cover and/or the substrate.

Figure 4A:
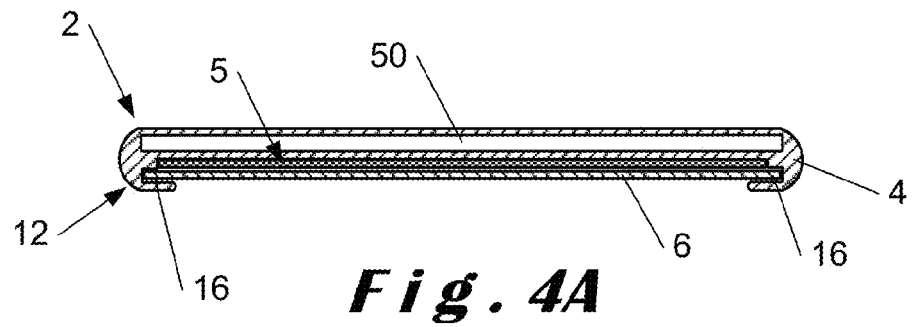
FIG. 4A shows, in a cross-sectional view, a further embodiment of an assembly according to the invention.
Figure 4B:
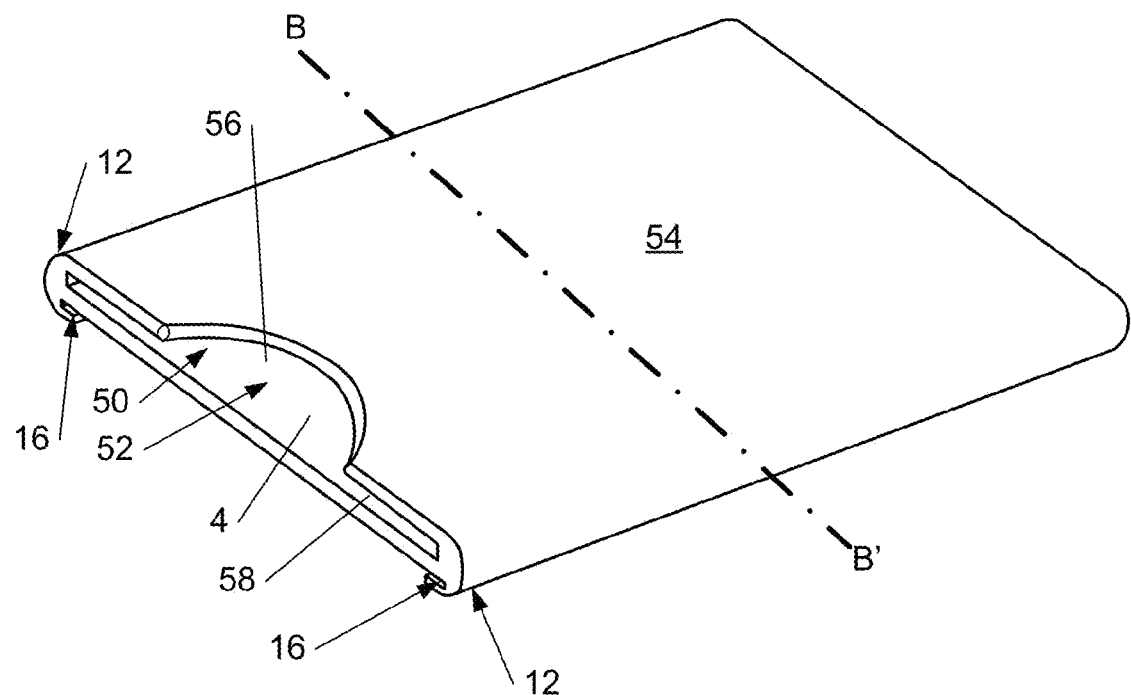
FIG. 4B shows a perspective view of the substrate of the assembly in the further embodiment.

FIG. 4A shows, in a cross-sectional view, a further embodiment of an assembly 2 according to the invention. FIG. 4B shows a perspective view of the substrate of the assembly in the further embodiment. FIGS. 4A and 4B show the substrate 4 provided with the plurality of selection areas, schematically indicated with reference number 5. The cross-section of FIG. 4A is indicated in FIG. 4B by means of dashed line B-B'. FIG. 4A further shows the cover 6 having the first main surface and, opposite to the first main surface, the second main surface, the cover further being provided with the window. FIGS. 4A and 4B also shows the holding means 12 having the groove 16. The holding means 12 are arranged for holding the cover 6 to the substrate 4 in a first cover position or a second cover position. In the further embodiment, the substrate 4 is combined with the holding means 12. In the further embodiment, the substrate 4 may be combined with a storage compartment 50 for storing one or more covers 6. Thus, the substrate 4 may be provided with the storage compartment 50. The storage compartment may e.g. extend along a backside 52 of the substrate 6. Thus, more in general, the storage compartment 50 may extend along a main side 52 of the substrate that is opposite to a main side of the substrate that is provided with the at least one selection area 5.

The storage compartment may be formed by a side wall 54. The side wall 54 may extend along the main side 52 of the substrate. The side wall 54 may be provided with a wall aperture 56. The wall aperture 56 may facilitate taking a cover from the storage compartment. The wall aperture 56 may be provided near an inlet and/or outlet 58 of the storage compartment 50. The side wall 54 may, at least partly, be transparent. Thus, a user may relatively easily see a colour of a cover stored in the storage compartment 50. Such an at least partly transparent side wall may combine well with the wall aperture, as both may facilitate taking a desired cover out of the storage compartment. The wall aperture 56 and/or a transparent side wall 54 may, optionally, be applied generally.

Figure 5A:
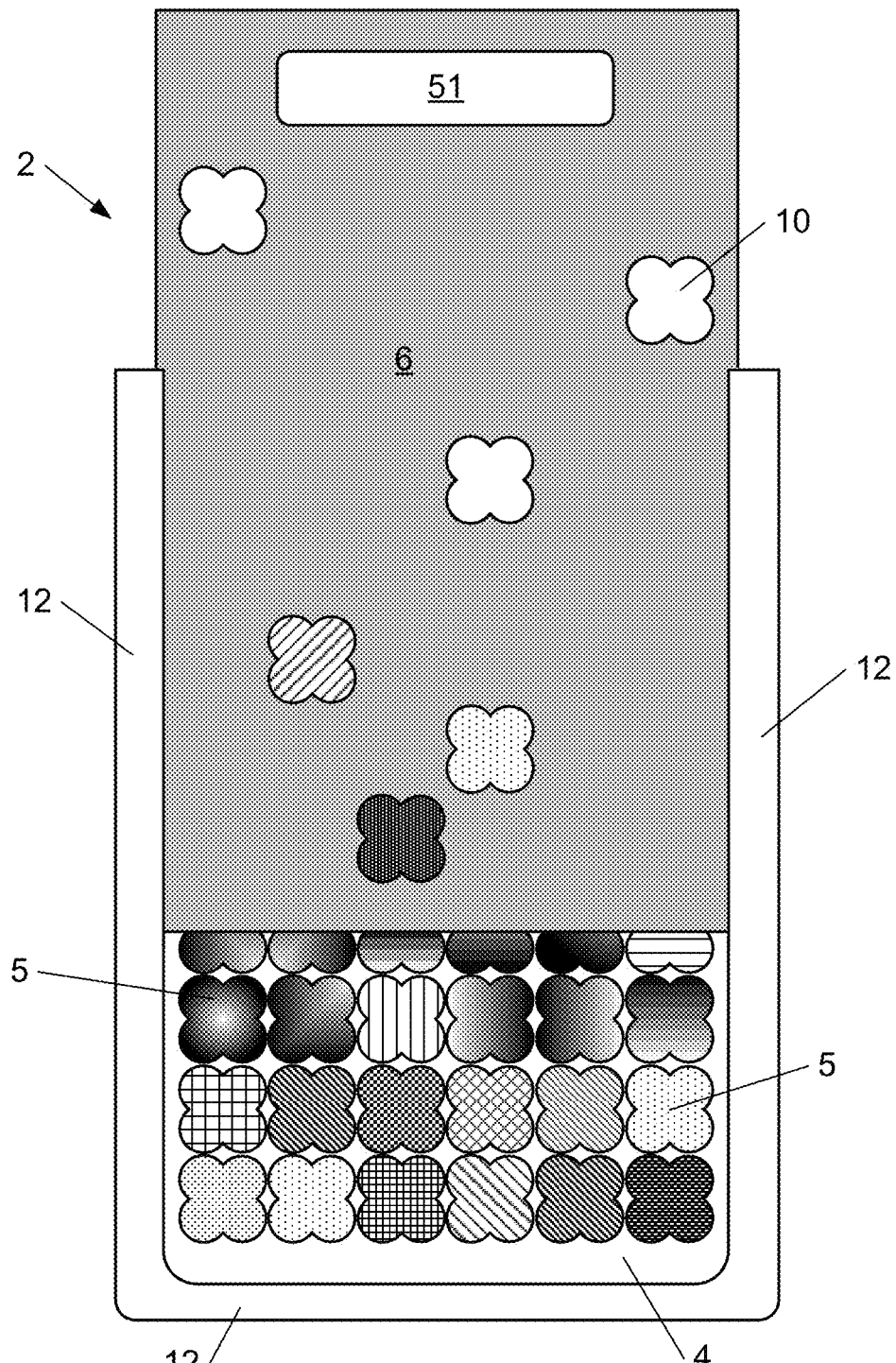
FIG. 5A shows, in an embodiment according to the invention, an assembly comprising a substrate and a cover, while the cover is being slid through a groove towards a first or second cover position.
Figure 5B:
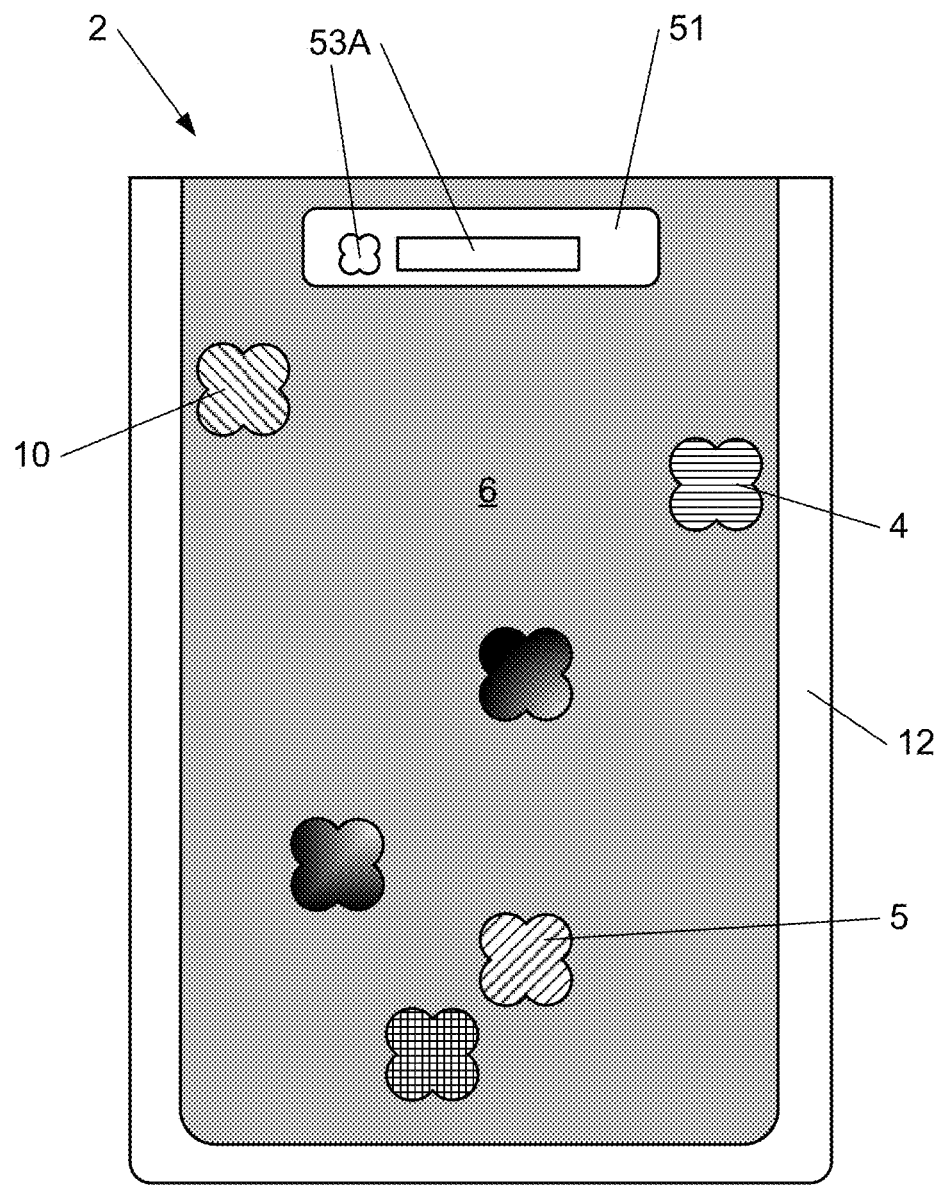
FIG. 5B shows an assembly with a cover held in a first or second cover position.
Figure 5C:
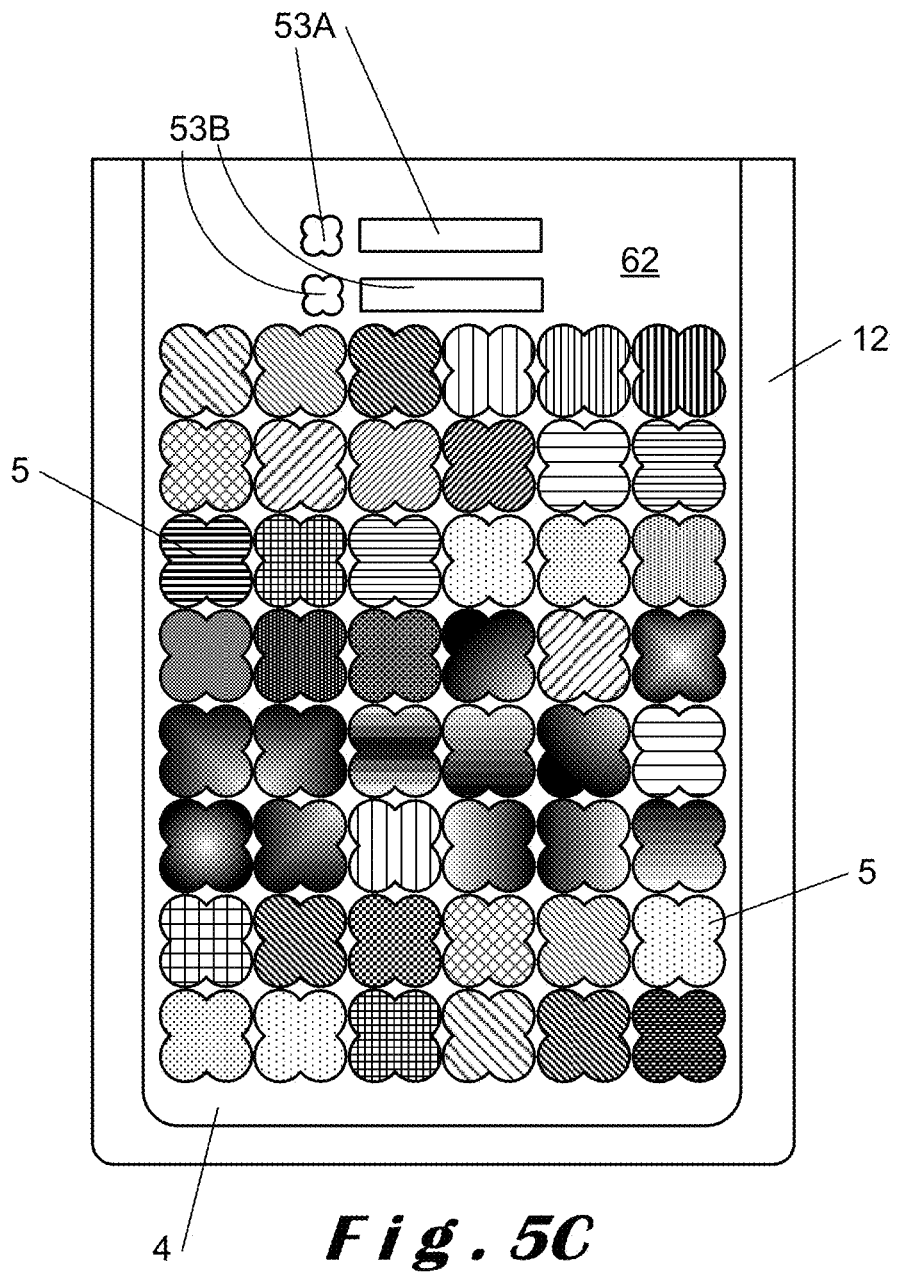
FIG. 5C shows the cover of FIGS. 5A and 5B.

FIGS. 5A and 5B show, in an embodiment according to the invention, an assembly 2 comprising the substrate 4 and the cover 6. FIG. 5C shows the cover of FIGS. 5A and 5B. FIG. 5A shows the assembly 2 while the cover 6 is being slid through the groove (not visible in FIG. 5 but visible in FIGS. 1C and 4 with reference number 16), towards the first or second cover position. FIG. 5B shows the assembly 2 with the cover held in the first or second cover position. FIGS. 5A and 5B also show the window 10 having, in this example, six sub-windows. The sub-windows may be formed to express a logo or mark, e.g. a logo or a mark of a provider of the cover. Similarly, the selection areas 5 may be formed to express a logo or a mark. Thus, more in general, the sub-windows and the selection areas may have a similar form. In particular, the sub-windows may be formed in such a way that, with the cover in the first cover position or in the second cover position, only exposed selection areas are visible through the window portions. Thus, a surface area of a sub-window may be equal to or larger than a surface area of a selection area that is exposed—or is to be exposed—through that sub-window.

The cover 6 may be provided with a, transparent and/or opened, cover portion 51. The cover portion 51 may be rectangularly shaped. Information 53A may be provided on the substrate 4, at a position that corresponds with a position of the cover portion 51 when the cover is in the first or second cover position. Thus, when the cover 6 is positioned in the first cover position or in the second cover position, the information 53A that is provided on the substrate 4 may be visible to a user through the cover portion 51. Preferably, the cover portion 51 is positioned substantially symmetrically with respect to a central axis of the cover 6. Then, said information 53A may be visible with the cover 6 in the first cover position and with the cover 6 in the second cover position. Alternatively, the cover portion 51 may be positioned substantially asymmetrically with respect to a central axis of the cover 6. The information on the substrate may e.g. comprise a season and/or a year for which the cover and the substrate are intended. Alternatively or additionally, the information may comprise a logo. Said season may e.g. be a fashion season, such as the spring/summer season or the autumn/winter season.

A position of the cover portion 51 may be specific to certain information, e.g. a certain season and/or a certain year. Thus, e.g., a cover 6 that is intended to be used for a spring/summer season may have a cover portion 51 that is positioned differently than a cover portion 51 of a cover that is intended to be used for an autumn/winter season. Thus, e.g., the cover portion 51 of a cover 6 that is intended to be used for a spring/summer season may e.g. expose information 53A comprising the text "spring/summer" or the like, and the cover portion 51 of a cover 6 that is intended to be used for an autumn/winter season may e.g. expose information 53B comprising the text "autumn/winter" or the like. Hence, confusing such season and/or year specific covers 6 with each other may be prevented. Using an outdated cover may be detected by the information 53A, 53B being completely or partly invisible, or by exposure of information that is perceived as being wrong by the user. Thus, more in general, a plurality of covers may be provided, said covers having mutually differently positioned cover portions 51 that are transparent and/or opened. The cover portions 51 may be positioned in the cover for exposing information provided on the substrate 4 additional to the selection areas 5, when the cover is in the first cover position and/or in the second cover position. Hence, preferably, the cover is provided with a surface part 62 that is free of selection areas. The surface part 62 may comprise at least 5% and/or at most 25% of a total surface area of the substrate 6. Said total surface would, optionally, in principle be available for providing selection areas thereon. The information 53A, 53B may be provided on said surface part 62 of the substrate 4.

Figure 6A:
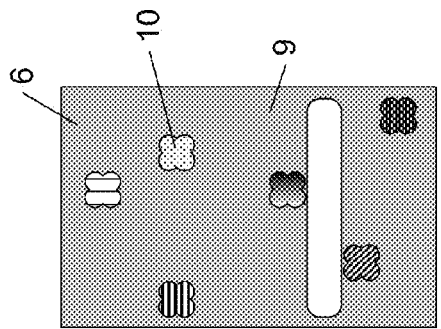
FIG. 6A shows main sides of a first cover.
Figure 6B:
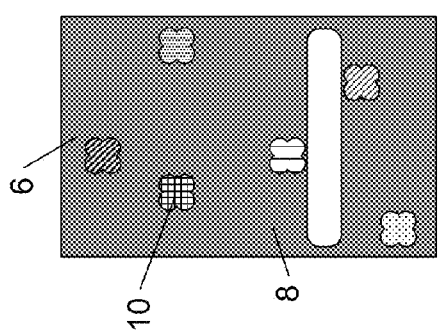
FIG. 6B shows main sides of a second cover.
Figure 6C:
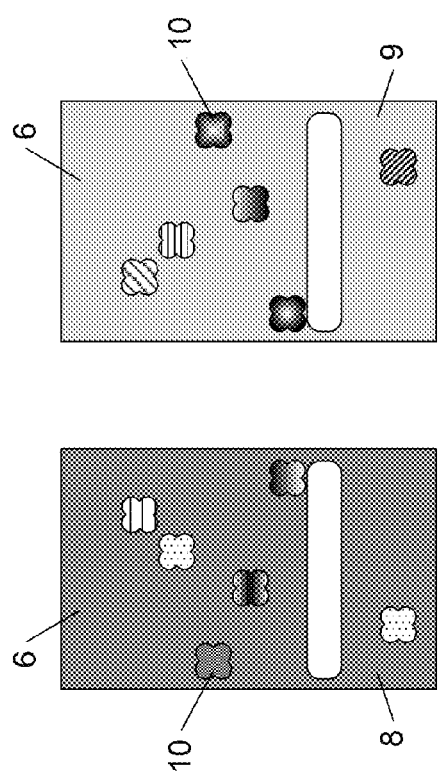
FIG. 6C shows main sides of a third cover.
Figure 6D:
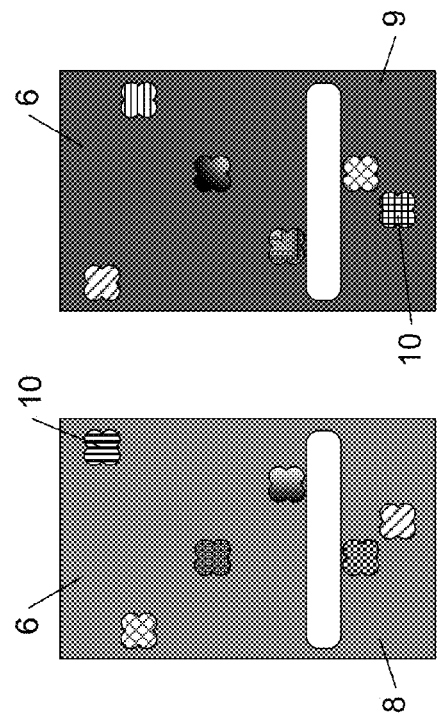
FIG. 6D shows main sides of a fourth cover.

FIGS. 6A-6D illustrate a plurality of covers, here a group of four covers 6, of an assembly in an embodiment according to the invention. The covers 6 are provided with the window 10. FIG. 6A shows the two main sides of a first cover 6, i.e. the first main side 8 and the second main side 9. The first main side 8 may e.g. be provided with violet as the first base colour. The second main side 9 may e.g. be provided with a mustard-like colour as the second base colour. FIG. 6B shows the two main sides of a second cover 6, i.e. the first main side 8 and the second main side 9. The first main side 8 may e.g. be provided with blue petrol as the first base colour. The second main side 9 may e.g. be provided with a rust-like colour as the second base colour. FIG. 6C shows the two main sides of a third cover 6, i.e. the first main side 8 and the second main side 9. The first main side 8 may e.g. be provided with blue denim as the first base colour. The second main side 9 may e.g. be provided with rose-antique as the second base colour. FIG. 6D shows the two main sides of a fourth cover 6, i.e. the first main side 8 and the second main side 9. The first main side 8 may e.g. be provided with red as the first base colour. The second main side 9 may e.g. be provided with an aubergine-like colour as the second base colour.

The assembly 2, in one or more of the embodiments described above, or in another embodiment, may be used for carrying out a variant of a method according to the invention. Said variant comprises selecting matching colours to a base colour of a clothing article. The variant may comprise providing a substrate 4 provided with a plurality of selection areas 5 that have mutually differing selection colours among which are the matching colours. The variant may further comprise providing a cover 6 having a first main surface 8 provided with a first base colour of a first clothing article, and having, opposite to the first main surface, a second main surface 9. The cover may be provided in combination with the clothing article. Additionally or alternatively, the substrate may be provided in combination with the clothing article. The cover and/or the substrate may e.g. be attached to the clothing article.

The cover is further provided with a window. The variant may comprise holding the cover to the substrate in a first cover position wherein, by means of the window, at least one, e.g. six, selection area is exposed having a matching colour that matches, based on a predetermined matching method, the first base colour. Thus, six matching colours are exposed that may be determined by means of a predetermined matching method.

In the first cover position, the first main surface faces away from the substrate so that it is visible to a user of the assembly. The variant may further comprise holding the cover to the substrate in a second cover position wherein, by means of the window, at least one selection area is exposed having a matching colour that matches, based on a predetermined matching method, a second base colour of a second clothing article, wherein the second main surface is provided with the second base colour. In the second cover position, the second main surface faces away from the substrate so that it is visible to a user of the assembly.

In an embodiment, the variant may comprise combining the first clothing article with a further clothing article having a selected matching colour that matches, based on the predetermined matching method, the first base colour. The embodiment may further comprise combining the second clothing article with a further clothing article having a selected matching colour that matches, based on the predetermined matching method, the second base colour. Thus, the user may be helped in choosing fashionable and/or safe clothes.

It may thus be appreciated that, more in general, the predetermined matching method may e.g. comprise combining matching colours to base colours approximately monochromatically, approximately analogously, approximately achromatically, and/or approximately complementary. Matching colours may e.g. be combined to base colours to form a group of two, three, four, five, six, seven, or more than seven colours. According to a predetermined matching method, in an embodiment, a matching colour may be selected in order to promote that the combination of a base colour and a matching colour provides an easily noticeable combination.

It may thus be clear from the above that an assembly in an embodiment according to the invention may provide a convenient way of selection matching colours to said base colours, enabling a relatively easy exposure of matching colours to different base colours by optionally using only a single cover.

The invention is not limited to the embodiments and variants described above. More in general, the first and second base colour may be chosen from a number, e.g. six, trend colours. Such trend colours may e.g. be determined by a provider of the cover. The trend colours may e.g. be determined in accordance with a trend of a year or a season. E.g., twice a year six new trend colours may be chosen. An embodiment of a method may comprise manufacturing covers having new trend colours as base colours. Similarly, twice a year a new substrate may be manufactured. A substrate may have a set of selection colours adjusted to said new trend colours. A relevant year and season may be indicated on a cover and/or a substrate. In that way, a chance for a user to use an old-fashioned cover may be reduced. A position of a transparent and/or opened cover portion may be varied. E.g., the position of said cover portion in a cover may be different for a cover intended for a certain year and/or season, compared to a position of a cover portion in a cover intended for another year and/or season. Preferably at least four, e.g. four, of the matching colours may be nuancing colours to the first base colour or the second base colour. Preferably, the first main surface is provided with an indication that indicates a type of a matching colour. Thus, it may be indicated whether a matching colour is a nuancing colour, a complementary colour, or another type of colour. More than one type may be indicated for a particular matching colour. A number of selection colours and selection areas on the substrate may be chosen to enable a sufficiently broad spectrum of matching colours that can be exposed in combination with one cover, or in combination with a plurality of covers, e.g. three covers. The cover may e.g. at least comprise 36 selection areas, preferably may comprise at least 56 selection areas.

The invention claimed is:

1. An Assembly for selecting matching colours to base colours of user articles, the assembly comprising:
   a substrate comprising a plurality of selection areas that have mutually differing selection colours among which are the matching colours;
   a cover having a first main surface provided with a first base colour, and having, opposite to the first main surface, a second main surface;
   the cover further comprising a window; and
   holding means for holding the cover to the substrate;
   wherein the window and the holding means are arranged for holding the cover to the substrate in a first cover position wherein, by means of the window, at least one selection area is exposed having a matching colour that matches, based on a predetermined matching method, the first base colour, wherein the second main surface is provided with a second base colour that is different from the first base colour, and the window and the holding means are arranged for holding the cover to the substrate in a second cover position wherein, by means of the window, at least one selection area is exposed having a matching colour that matches, based on a predetermined matching method, the second base colour, wherein, when the cover is in the first cover position, the first main surface faces away from the substrate so that it is visible to a user of the assembly, and, when the cover is in the second cover position, the second main surface faces away from the substrate so that it is visible to a user of the assembly.

2. The Assembly according to claim 1, wherein the cover is formed as a card having the first main surface and the second main surface.

3. The Assembly according to claim 1, wherein the cover defines a center of the cover and wherein at least a portion of the window is positioned asymmetrically with respect to the center, so that, when the cover is in the first cover position, at least one selection area is exposed that is not exposed when the cover is in the second cover position.

4. The Assembly according to claim 1, wherein the cover defines a center of the cover and wherein the window is positioned asymmetrically with respect to the center, so that each selection area that is exposed when the cover is in the second cover position is covered when the cover is in the first cover position.

5. The Assembly according to claim 1, wherein the cover defines a center of the cover and wherein a portion of the window is positioned substantially symmetrically with respect to the center, so that, when the cover is in the first cover position, at least one selection area is exposed that is also exposed when the cover is in the second cover position.

6. The Assembly according to claim 1, wherein the window comprises a plurality of window portions that are mutually spaced apart.

7. The Assembly of claim 6, wherein the plurality of window portions is six window portions.

8. The Assembly according to claim 1, wherein the substrate is provided with the holding means.

9. The Assembly according to claim 1, wherein the holding means further comprises:
   a guide that guides the cover towards the first cover position with the first main surface facing away from the substrate, and guides the cover towards the second cover position with the second main surface facing away from the substrate.

10. The Assembly according to claim 9, wherein the substrate further comprises:
    an edge portion with a groove that forms the guide.

11. The Assembly according to claim 1, wherein the substrate further comprises:
    a protective coating that covers the selection colours and the selection areas.

12. The Assembly according to claim 1, further comprising:
    a storage compartment combined with the substrate for storing the cover.

13. The Assembly according to claim 1, further comprising:
    a User article in assembly with at least one of the cover and the substrate.

14. The Assembly of claim 13, wherein the User article is one of a clothing article and a furniture article.

15. The Assembly according to claim 1, wherein the substrate is attached to a Mobile phone.

16. A Method for selecting matching colours to base colours of user articles, the method comprising:
    holding a cover to a substrate in a first cover position, wherein the substrate comprises a plurality of selection areas that have mutually differing selection colours among which are the matching colours, wherein the cover comprises a window and a first main surface that has a first base colour of a first user article and having, opposite to the first main surface, a second main surface, and wherein, by means of the window, at least one selection area is exposed having a matching colour that matches, based on a predetermined matching method, the first base colour, wherein, when the cover is in the first cover position, the first main surface faces away from the substrate so that it is visible to a user of the assembly; and holding the cover to the substrate in a second cover position wherein, by means of the window, at least one selection area is exposed having a matching colour that matches, based on a predetermined matching method, a second base colour of a second user article, wherein the second base colour is different from the first base colour, wherein the second main surface is provided with the second base colour, and wherein, when the cover is in the second cover position, the second main surface faces away from the substrate so that it is visible to a user of the assembly.

17. The Method according to claim 16, further comprising at least one of the steps of:

combining the first user article with a further user article having a selected matching colour that matches, based on the predetermined matching method, the first base colour; and combining the second user article with a further user article having a selected matching colour that matches, based on the predetermined matching method, the second base colour.

18. The Method according to claim 14, further comprising:

holding, via a holding means, the cover to the substrate in the first position and in the second position.

* * * * *